US012647176B2

(12) United States Patent
Buer

(10) Patent No.: US 12,647,176 B2
(45) Date of Patent: Jun. 2, 2026

(54) METHOD AND APPARATUS FOR BEAM-GROUP STEERING

(71) Applicant: ViaSat, Inc., Carlsbad, CA (US)

(72) Inventor: Kenneth V. Buer, Bluff City, TN (US)

(73) Assignee: Viasat, Inc., Carlsbad, CA (US)

( * ) Notice: Subject to any disclaimer, the term of this patent is extended or adjusted under 35 U.S.C. 154(b) by 281 days.

(21) Appl. No.: 18/691,199

(22) PCT Filed: Sep. 13, 2021

(86) PCT No.: PCT/US2021/050138
§ 371 (c)(1),
(2) Date: Mar. 12, 2024

(87) PCT Pub. No.: WO2023/038644
PCT Pub. Date: Mar. 16, 2023

(65) Prior Publication Data
US 2024/0405854 A1      Dec. 5, 2024

(51) Int. Cl.
*H04B 7/185*      (2006.01)
*H04B 7/195*      (2006.01)

(52) U.S. Cl.
CPC ..... *H04B 7/18513* (2013.01); *H04B 7/18515* (2013.01); *H04B 7/18582* (2013.01); *H04B 7/195* (2013.01)

(58) Field of Classification Search
CPC ............ H04B 7/18513; H04B 7/18515; H04B 7/18582; H04B 7/195; H04B 7/086;

H04B 7/2041; H04B 7/0617; H04B 7/0667; H04B 7/0682; H04B 7/06952; H04B 7/088; H04B 7/212
See application file for complete search history.

(56) References Cited

U.S. PATENT DOCUMENTS

| | | | |
|---|---|---|---|
| 8,144,643 B2 | 3/2012 | Miller et al. | |
| 11,088,757 B2 * | 8/2021 | Agarwal | H04B 7/19 |
| 2019/0089434 A1 | 3/2019 | Rainish et al. | |
| 2019/0115975 A1 | 4/2019 | Freedman et al. | |
| 2020/0076497 A1 * | 3/2020 | Agarwal | H04B 7/18513 |
| 2020/0274611 A1 * | 8/2020 | Mendelsohn | H01Q 3/18 |

OTHER PUBLICATIONS

International Search Report and Written Opinion for App No. PCT/US2021/050138, Jun. 10, 2022, 15 pages.

* cited by examiner

*Primary Examiner* — Hashim S Bhatti
(74) *Attorney, Agent, or Firm* — Murphy, Bilak & Homiller, PLLC

(57) ABSTRACT

A beamforming method (700) and apparatus (10) disclosed herein use an advantageous approach to beamforming involving the application of beamforming weights (24) that define respective beams (72) of a beam group (70) as spatially non-overlapping and having fixed spatial relationships within the beam group (70), and the application of beam-group steering weights (28) that steer the respective beams (72) of the beam group (70) in a common direction. The arrangement allows, for example, limiting the beamforming structure of the beamformer (12) to that needed for defining the beam group (70), with beam-group steering then used to point the beam group (70) in various directions to provide greater signal coverage over time.

29 Claims, 10 Drawing Sheets

INTERVAL T2

INTERVAL T1

INTERVAL T4

INTERVAL T3

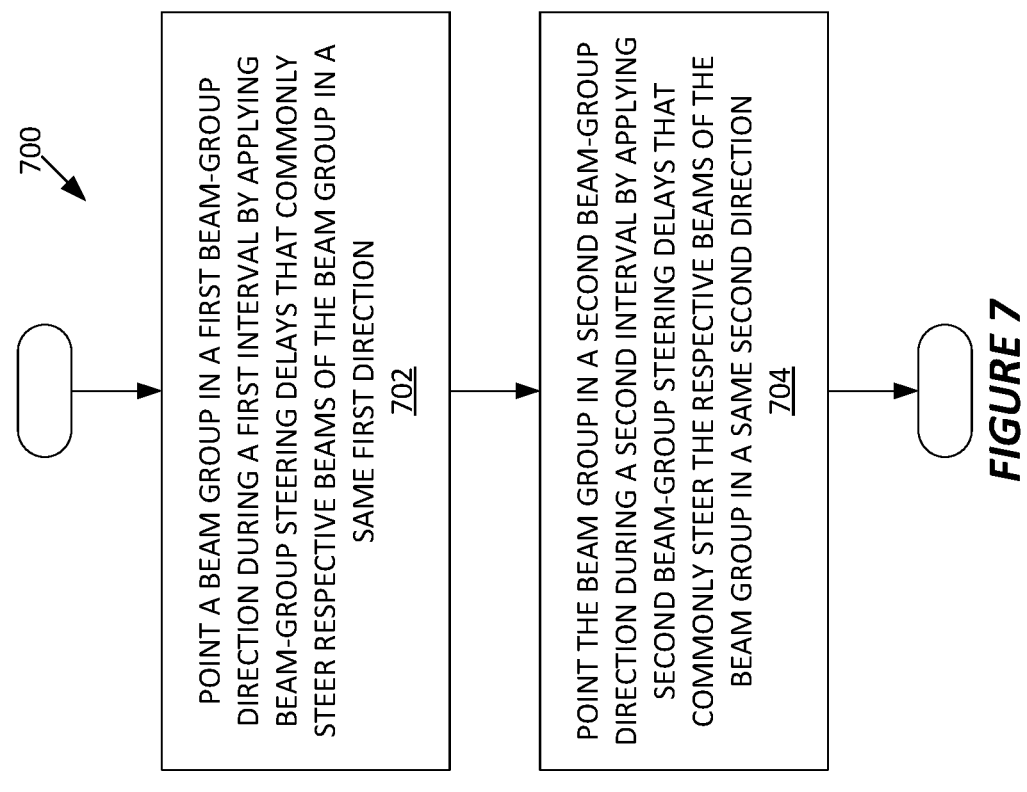

700

POINT A BEAM GROUP IN A FIRST BEAM-GROUP DIRECTION DURING A FIRST INTERVAL BY APPLYING BEAM-GROUP STEERING DELAYS THAT COMMONLY STEER RESPECTIVE BEAMS OF THE BEAM GROUP IN A SAME FIRST DIRECTION
702

POINT THE BEAM GROUP IN A SECOND BEAM-GROUP DIRECTION DURING A SECOND INTERVAL BY APPLYING SECOND BEAM-GROUP STEERING DELAYS THAT COMMONLY STEER THE RESPECTIVE BEAMS OF THE BEAM GROUP IN A SAME SECOND DIRECTION
704

*FIGURE 7*

METHOD AND APPARATUS FOR BEAM-GROUP STEERING

TECHNICAL FIELD

Apparatus and methods disclosed herein relate to beamforming for the transmission or reception of electromagnetic signals, and, particularly, relate to beam-group steering using advantageous arrangements of beamforming circuitry.

BACKGROUND

"Beamforming" of electromagnetic signals refers to directional signal transmission or reception from an antenna, with "direction" referring to horizontal or vertical angles relative to the involved antenna. Beamforming a signal for transmission involves controlling the phase and amplitude of the signal from a plurality of antenna elements, to create a pattern of constructive and destructive interference in the resulting wavefront radiated from the antenna, with the pattern forming a beam of signal energy in the far field. Beamforming in the reception sense is similar and relies on weighting a signal received on the respective antenna elements according to a set of weights corresponding to a desired directional sensitivity.

A beamformer can be understood as "converting" between beam signals and element signals, where a "beam signal" represents a signal to be transmitted or received with a particular directional sensitivity, and where each element signal is a respectively weighted version of the beam signal corresponding to a particular one of the antenna elements of the antenna used for beamforming. The weightings comprise respective delays that cause the desired directionality via corresponding patterns of constructive and destructive combining.

The beamformer includes beamforming circuitry comprising the beamforming elements used to apply the respective per-element weights. In an example scenario involving N antenna elements and with respect to forming a given "first" beam having a given directionality, there are N beamforming elements, e.g., delay elements, to apply the respective per-element weights that result in formation of the first beam. Forming a second beam simultaneously with the first beam requires a further set of N beamforming elements that are configured to apply the respective per-element weights that result in formation of the second beam. Here, each "weight" may be a complex value involving phase and amplitude.

Scenarios requiring a relatively large number of different beams, e.g., hundreds of beams corresponding to different beam directions, bring their own design and implementation challenges. One context where such challenges exist is in the realm of satellite communications, such as the implementation of a Low Earth Orbit (LEO) satellite that uses beamforming to provide spot beams corresponding to a large plurality of respective coverage areas.

SUMMARY

A beamforming method and apparatus disclosed herein use an advantageous approach to beamforming involving the application of beamforming weights that define respective beams of a beam group as spatially non-overlapping and having fixed spatial relationships within the beam group, and the application of beam-group steering weights that steer the respective beams of the beam group in a common direction. The arrangement allows, for example, limiting the beamforming structure of the beamformer to that needed to define the beam group, with beam-group steering then used to point the beam group in various directions to provide greater signal coverage over time.

An apparatus according to an example embodiment uses beamforming for transmission or reception of electromagnetic signals and it comprises a beamformer. The beamformer is configured to convert between beam signals corresponding to respective beams in a beam group and element signals corresponding to elements of an antenna used for the transmission or reception of electromagnetic signals. The beamformer comprises beamforming circuitry that is configured to apply beamforming weights with respect to the element signals and further configured to apply beam-group steering weights. The beamforming weights define the respective beams of the beam group as spatially non-overlapping and having fixed spatial relationships within the beam group, while the beam-group steering weights commonly steer the respective beams of the beam group in a same direction. Control circuitry included in the apparatus is configured to control the beam-group steering by the beamformer, based on controlling the beam-group steering weights.

Another example embodiment comprises a method of operation by an apparatus that uses beamforming for transmission or reception of electromagnetic signals. The method comprises pointing a beam group in a first beam-group direction during a first interval by applying, in a beamformer of the apparatus, first beam-group steering weights that commonly steer respective beams of the beam group in a same first direction. The method further includes pointing the beam group in a second beam-group direction during a second interval by applying, in the beamformer, second beam-group steering weights that commonly steer the respective beams of the beam group in a same second direction. In the context of these method operations, the beamformer converts between beam signals corresponding to the respective beams in the beam group and element signals corresponding to elements of an antenna used for the transmission or reception of electromagnetic signals. The beamformer applies beamforming weights that define the respective beams of the beam group as spatially non-overlapping and having fixed spatial relationships within the beam group, whereas application of the beam-group steering weights point the beam group as a whole, with the pointing direction determined by the values of the beam-group steering weights.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 is a block diagram of a method of operation by an apparatus that employs beam-group steering, according to an example embodiment.

DETAILED DESCRIPTION

Figure 1:
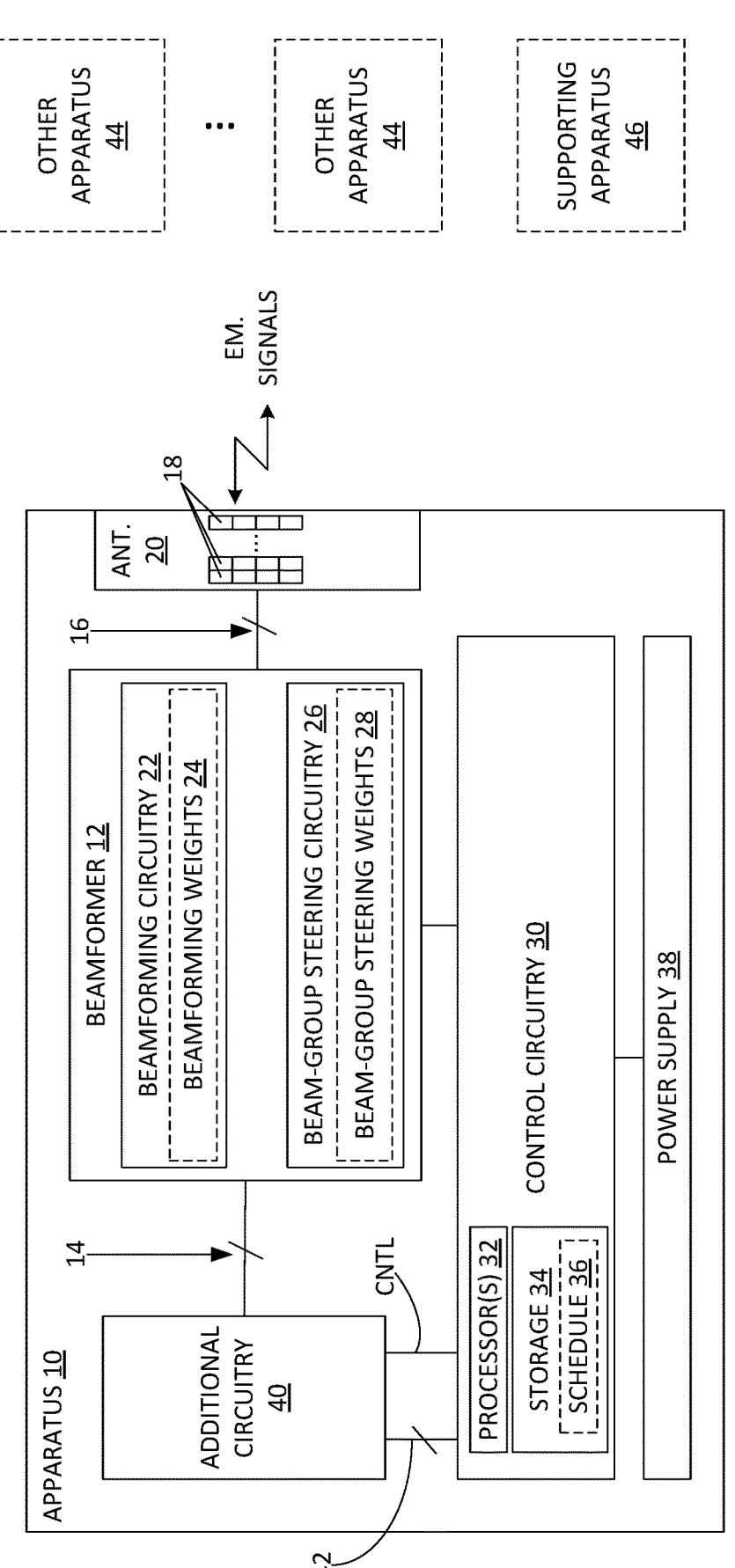
FIG. 1 is a block diagram of an apparatus according to one embodiment.

FIG. 1 illustrates an apparatus 10 that uses beamforming for transmission or reception of electromagnetic signals. The apparatus 10 includes a beamformer 12 that is configured to convert between beam signals 14 corresponding to respective beams in a beam group and element signals 16 corresponding to elements 18 of an antenna 20 used for the transmission or reception of electromagnetic signals.

Beamforming circuitry 22 of the beamformer 12 is configured to apply beamforming weights 24 that define the beam group, where the beamforming weights 24 are applied by the beamforming circuitry 22 to realize the respective beams included in the beam group. The beamforming weights 24 comprise respective sets of per-element amplitude and/or phase values that define each beam in the beam group and define the relative spatial relationships of the respective beams in the beam group. In at least one embodiment, the beamforming weights 24 are fixed and determined by the physical structure of the beamforming circuitry 22.

Beam-group steering circuitry 26 further included in the beamformer 12 is configured to apply beam-group steering weights 28 that "steer" the beam group defined by the beamforming circuitry 22. Here, "steering" the beam group means applying a common change in angular direction to all the beams of the beam group, such that the spatial relationships between the respective beams in the beam group is preserved. Beam-group steering may be regarded as changing the "pointing direction" of the overall beam group, without altering the inter-beam spatial relationships of the beam group—i.e., the beam pattern—defined by the beamforming weights 24.

Control circuitry 30 of the apparatus 10 is configured to control beam-group steering by the beamformer 12. In an example implementation, the control circuitry 30 comprises one or more processors 32 and storage 34. The one or more processors 32 comprise, for example, one or more microprocessors, microcontrollers, Digital Signal Processors (DSPs), Field Programmable Gate Arrays (FPGAs), Application Specific Integrated Circuits (ASICs), Complex Programmable Logic Devices (CPLDs), or other digital processing circuitry.

A schedule 36 is held in the storage 34 in one or more embodiments and is used by the one or more processors 32 to control beam-group steering by the beamformer 12. An example schedule 36 defines the beam-group pointing direction to be used in each interval, among a succession of intervals. The schedule 36 may be static or may be dynamically determined, such that it changes or is redetermined from time to time, and the storage 34 comprises one or more types of computer-readable media appropriate for storing the schedule 36.

In at least one embodiment, the storage 34 comprises a mix of volatile storage, e.g., working memory for program execution, live data, etc., and non-volatile storage for longer-term storage, e.g., of computer programs, provisioned configuration data, etc. In at least one such embodiment, the control circuitry 30 is realized based on the execution of computer program instructions by the one or more processors 32, where the storage 34 provides non-transitory storage for one or more computer programs comprising such instructions. Broadly, the control circuitry 30 comprises fixed circuitry, programmatically-configured circuitry, or a mix of fixed and programmatically-configured circuitry.

Other elements of the apparatus 10 include a power supply 38, which may be dedicated to the apparatus 10 or shared with other circuitry, such as might be the case in scenarios where the apparatus 10 comprises an assembly or subassembly of a larger system. Further elements include additional circuitry 40, which in one or more embodiments includes a switch matrix or other circuitry that is configured to perform a mapping or coupling between respective transmit (TX) or receive (RX) signals 42 and corresponding ones of the beam signals 14.

In this regard, the additional circuitry 40 may comprise transceiver circuitry for generating or processing the respective TX or RX signals, which may be communication signals carrying "user traffic" and related control signaling for one or more other apparatuses 44, and for exchanging user traffic and control signaling with one or more supporting apparatuses 46. For example, in at least one embodiment, the apparatus 10 comprises part of a communication satellite that provides communication services to terrestrial user terminals—e.g., the other apparatuses 44—based on relaying forward-link and return-link user traffic from one or more terrestrial gateway terminals—e.g., the supporting apparatuses 46. Control signals—labeled as "CNTL" in the diagram—are output by the control circuitry 30 in one or more embodiments, for controlling the operation of the additional circuitry 40.

In a transmit-related example, the signals 42 comprise individual transmit signals, each of which may be a composite of user traffic targeting particular ones of the other apparatuses 44. Correspondingly, the control circuitry 30 controls the additional circuitry 40 to couple each transmit signal to a respective one of the beams in the beam group, for serving traffic to other apparatuses 44 within a beam coverage area of the respective beam. In a receive-related example, the signals 42 comprise individual receive signals, each of which may be a composite of user traffic originating from other apparatuses 44 within the coverage area of a respective one of the beams in the beam group. Beam-group steering provides an efficient and operationally-advantageous mechanism for sweeping, stepping, or otherwise moving the respective beam coverage areas of the beam group within a larger geographic region, to increase the aggregate or collective coverage area of the beam group.

Figures 2A, 2B, 3A, 3B:
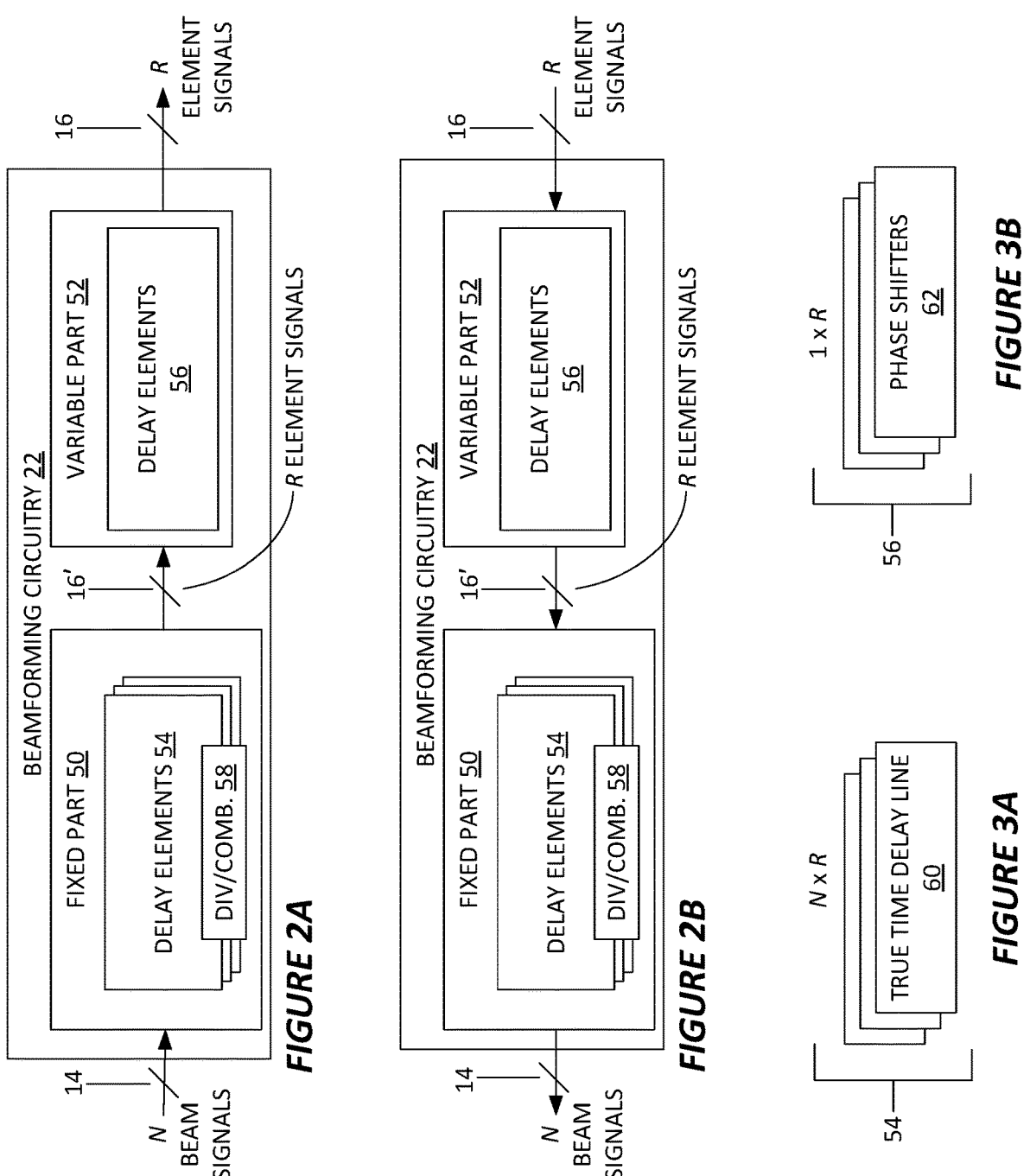
FIGS. 2A and 2B are block diagram depicting example details for the apparatus of FIG. 1.
FIGS. 3A and 3B are block diagrams depicting delay-element implementations for beamforming and beam-group steering, according to an example embodiment.

FIG. 2A highlights example details for implementation of the beamformer 12, according to a transmit beamforming example. FIG. 2B depicts a receive beamforming example. Embodiments of the beamformer 12 corresponding to the details of FIGS. 2A and 2B feature a "fixed" part 50 and a "variable" part 52. Note that in embodiments where the apparatus 10 performs both transmit and receive beamforming, there could be a single beamformer 12 having an internal configuration that provides for both transmit beamforming and receive beamforming, or there could be two instances of the beamformer 12, one configured for transmit beamforming and one configured for receive beamforming.

The fixed part 50 is responsible for defining the beam group with its respective beams, while the variable part 52 is responsible for steering (pointing) the beam group. As such, the fixed part 50 is an example depiction of the beamforming circuitry 22, where a plurality of sets of delay elements 54 is used to implement the beamforming weights 24 that define the beam group. The variable part 52 is an example depiction of the beam-group steering circuitry 26 and it includes delay elements 56, e.g., a single set of delay elements, that are used to implement the beam-group steering weights 28.

Using a fixed part 50 to produce a beam group having a fixed number of beams that have fixed spatial relationships and then using a variable part 52 to steer the beam group allows, for example, the beam group to be steered over a desired angular range by incrementally changing the pointing direction of the beam group. Such an arrangement allows the beam group to serve a larger coverage area than if the beam group was not steered. One advantage of the arrangement is that it may be cheaper, lighter, less power hungry, better performing, and more reliable than implementing a fixed part that is capable of producing the number of beams needed to serve the larger coverage area.

Here, "fixed" means that the involved beamforming elements are designed or otherwise configured to implement a respective constant set of weights rather than being tunable across a range of weights. Note, however, that a fixed beamforming element may be calibratable or tunable, e.g., to achieve a desired setting. More broadly, describing beamforming elements as fixed with respect to some period of operation denotes the use of a fixed set of beam weights during that period. Thus, the fixed part 50 may apply the same beamforming weights 24 over some period of time, which defines the inter-beam relationships of the beam group, while the variable part 52 varies the beam-group steering weights 28 over that same period of time, to steer the beam group in different directions.

Turning back to the example context of FIGS. 2A and 2B, let N represent the number of beams in the beam group and R represent the number of antenna elements 18 being used for beamforming. For transmit beamforming, transmitting a given one of the signals 42 in a respective one of the N beams comprising the group of beams means transmitting a respectively weighted version of the signal 42 on each of the R antenna elements 18. For simultaneous transmission of the N beams, then, the sets of delay elements 54 are configured to provide the beamforming weights 24 as N sets of beamforming weights 24. Each one of the N sets of beamforming weights 24 corresponds to a respective one of the N beams and each one of the N sets of beamforming weights 24 includes R weights. Each of the R weights corresponds to a respective one of the element signals 16, which in turn corresponds to a respective one of the antenna elements 18. The same relationships hold for simultaneous reception of the N beams, in a receive beamforming example.

In a transmit example, each one of the N beams is defined by a respectively weighted set of R element signals, and divider/combiner circuitry 58, which is shown as "DIV/COMB." in the diagram, combines these respectively weighted sets of R element signals to form a composite set of R element signals 16' that is fed into the variable part 52. The delay elements 56 are configured to apply a set of R phase delays for beam-group steering, to thereby form the final set of R element signals 16 that go to the respective antenna elements 18. Thus, in the context of a transmit beamforming scenario, the difference between the R element signals 16' and the R element signals 16 is that the R element signals 16' do not have the beam-group steering weights 28 applied to them.

The opposite case holds in a receive beamforming scenario, where the R element signals 16 do not have the beam-group steering weights 28 applied to them and the R element signals 16' do have the beam-group steering weights 28 applied. In more detail, in a receive beamforming scenario, the R element signals 16 feed into the variable part 52 from the R antenna elements 18, with the variable part 52 applying the beam-group steering weights 28 to them, to obtain the R element signals 16' that feed into the fixed part 50, for beam-group beamforming. Particularly, in a receive beamforming context, the divider/combiner circuitry 58 receives the R element signals 16' and divides them into N sets of R element signals 16', with each such set having a respective set of R beamforming weights 24 applied, to form one of the N beams in the beam group.

One of the several advantages of the embodiments depicted in FIGS. 1, 2A, and 2B, is that a single set of R beam-group steering elements is needed, e.g., one set of R delay elements 56, to perform beam-group steering, regardless of the number of beams included in the beam group. Further, delay elements 56 or other elements used to apply the beam-group steering weights 28 need not be as sophisticated as those used to apply the beamforming weights 24 used to define the beam group itself. FIGS. 3A and 3B offer such an example.

FIG. 3A illustrates implementation of the N sets of R delay elements 54 according to one or more embodiments, where each set of delay elements 54 comprises a set of true time delay lines 60. FIG. 3B illustrates a complementary implementation of the single set of R delay elements 56 as a set of phase shifters 62. Application of the beamforming weights 24 according to FIG. 3A is realized, at least in part, via imposition of the respective delays provided by the true time delay lines 60, which may include or be associated with amplitude-weighting elements. Application of the beam-group steering weights 28 is realized via imposition of the respective phase shifts provided by the phase shifters 62.

In the context of per-element delays at any given fixed frequency, one may effectively ignore whole numbers of wavelengths, meaning that phase shifts and time delays are nominally equivalent. However, the phenomena of "beam squint" occurs when only fixed phase shifting is used to form the beams for a range of signal frequencies. That is, a conventional phase shifter applies a fixed phase shift irrespective of frequency, meaning that the inter-element phase shifts used for forming the beams will be appropriate for a particular signal frequency and will become increasingly inaccurate as the signal frequency changes. Conversely, as compared to a phase shifter, a true time delay line 60 is operative to provide potentially many wavelengths of phase shift and the phase shift is frequency dependent, which allows the inter-element delays used for forming the beam group to vary as a function of signal frequency and thereby avoid beam squint.

According to the example of FIG. 3A, the delay elements 54 comprise N sets of R true time delay lines 60, where N is the number of beams in the beam group and R is the number of antenna elements 18 in the involved antenna 20. Correspondingly, according to the example of FIG. 3B, the delay elements 56 comprise one set of R phase shifters 62. The R phase shifters 62 apply a particular set of inter-element phase shift values that commonly affect all the inter-element delays imposed by the true time delay lines 60. As such, the phase shift values provided by the R phase shifters 62 commonly steer all N beams in the beam group—i.e., cause the same change in relative beam angle for each beam in the beam group. By controlling the values of phase shifts applied by the phase shifters 62—i.e., the beam-group steering weights 28—the control circuitry 32 controls the pointing direction of the beam group.

Figures 4A, 4B, 4C, 4D:
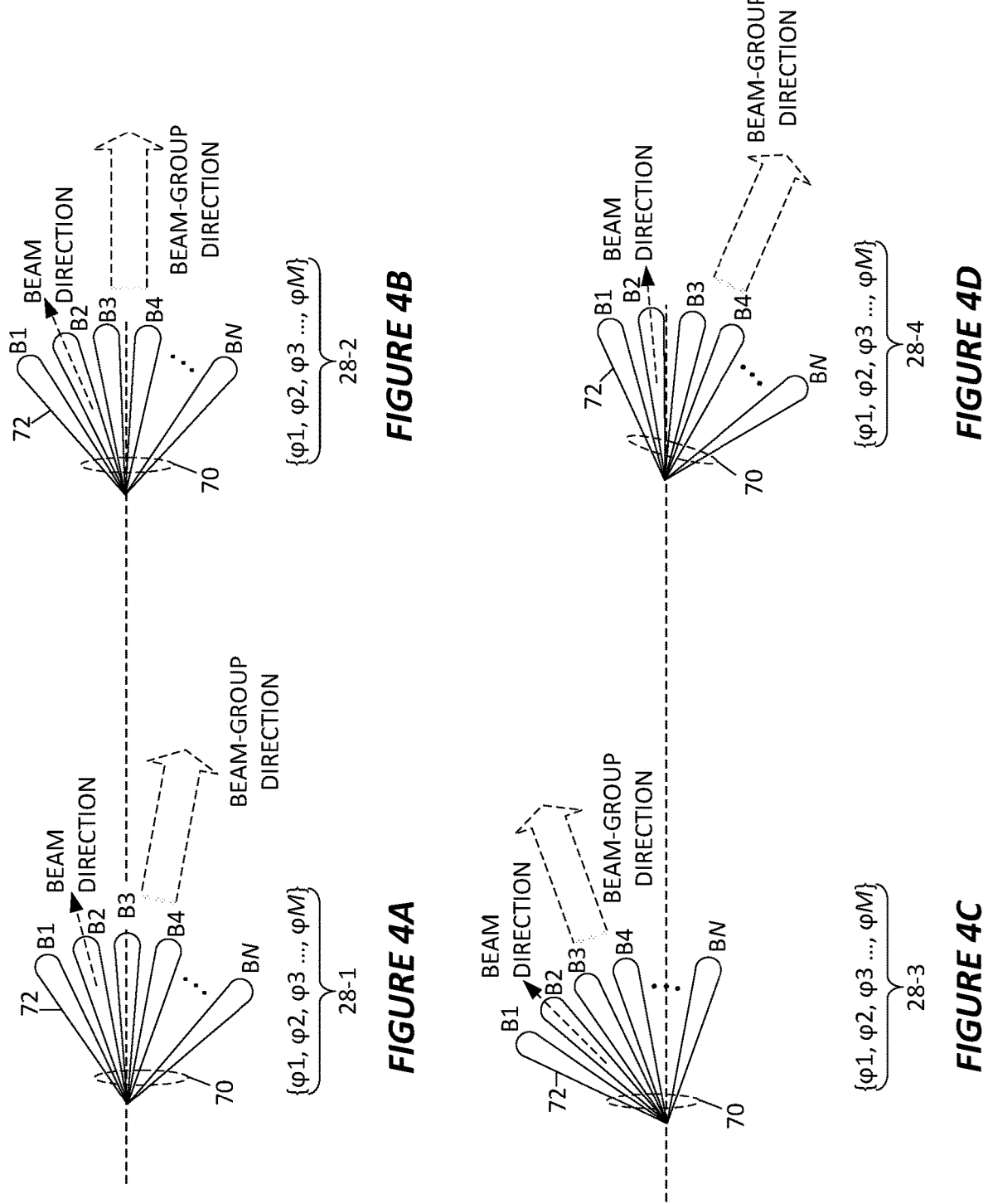
FIGS. 4A-4D are diagrams of example beam-group pointing directions corresponding to different sets of beam-group steering weights.

FIGS. 4A-4D offer illustrative examples of the advantageous beam-group steering or pointing provided by the beamformer 12 operating under control of the control circuitry 30. Particularly, FIG. 4A illustrates a beam group 70 having a plurality of beams 72, which are shown as beams B1, B2, . . . BN. The beam group 70 may be regarded as a "sparse" beam group in that the respective beams 72 are spatially non-overlapping, where "non-overlapping" may be defined by a signal-level threshold, such as the 3-dB beamwidth. The 3-dB beamwidth is the angle between the half-power points of the main lobe of the beam. The capability of full frequency reuse between the respective beams 72 of the beam group 70 is one of several advantages gained by the sparse, non-overlapping beam arrangement.

A further point to emphasize is that the respective beams 72 in the beam group 70 have a fixed spatial relationship among them. That is, the relative angles of the beams 72 remain the same, irrespective of the direction in which the beam group 70 is pointed. Saying that the beamforming circuitry 22 defines the beam group 70 such that its beams 72 have a fixed spatial relationship can be understood as saying that the beamforming circuitry 22 is designed or otherwise configured so that the relative differences in beam directions among the beams 72 in the beam group 70 do not intentionally vary with time.

In an example embodiment, the beams 72 are spot beams of a satellite and each beam 72 produces a corresponding spot beam footprint on the surface of the earth. Thus, the beam group 70 in such embodiments can be understood as providing a fixed pattern of spot beam footprints and the control circuitry 30 in at least one such embodiment is configured to control the beam-group steering circuitry 26 to incrementally shift or step that fixed pattern of spot beam footprints over or within a geographic coverage area. That is, for any given pointing direction, the fixed pattern of spot beam footprints covers only a portion of the geographic area, but moving the pattern over a succession of intervals allows time-multiplexed coverage to be provided to the entire geographic coverage area.

FIG. 4A shows that a first set of beam-group steering weights 28-1 yield a first beam-group direction, with FIGS. 4B, 4C, and 4D illustrating other beam-group directions yielded by different sets of beam-group steering weights 28-2, 28-3, and 28-4. Another way of viewing beam-group steering holds that there in only one "set" of beam-group steering weights 28, i.e., one phase vector, with the understanding that changing the element values of the phase vector changes the pointing direction of the beam group 70. With this view, the sets of beam-group steering weights 28-1, 28-2, 28-3, and 28-4 represent different values of beam-group steering weights at different times during the operation of the apparatus 10.

The absolute direction of each beam 72 in free space thus depends on the beam angle defined by the corresponding beamforming weights 24 and the corresponding beam-group steering angle defined by the beam-group steering weights 28. Use of the word "angle" here should be understood as broadly covering angles in one or more dimensions, e.g., angles in one or both of an azimuthal plane and an elevational plane, and beam-group steering in one or more embodiments moves the beam group 70 over or within a defined steradian.

Using phase shifters 62 only for beam-group steering while using true time delay lines 60 to form the respective beams 72 of the beam group 70 minimizes squinting issues in embodiments of the apparatus 10 that involve the use of multiple transmit or receive frequencies, while providing for a simplified and economical approach to steering the beam group 70. Of course, other realizations may be used, such as where the delay elements 54 include variable elements needed to implement the beam-group steering weights 28—e.g., true time delay lines used to impart the beamforming weights 24 are configured to be tunable to implement a common set of phase shifts representing the beam-group steering weights 28. However implemented, the use of beam-group steering weights 28 provides an advantageous approach pointing the beam group 70 in particular directions, where the pointing direction of the beam group 70 may be defined in a centroid sense, for example, with respect to the individual beam directions or corresponding beam areas, such as is suggested in FIGS. 4A-4D.

An example apparatus 10 according to the various examples discussed thus far can be broadly characterized as using beamforming for transmission or reception of electromagnetic signals, where the "or" here and elsewhere in this disclosure means "and/or" unless otherwise noted or otherwise clear from the context. The apparatus 10 in at least one embodiment comprises a beamformer 12 that is configured to convert between beam signals 14 corresponding to respective beams 72 in a beam group 70 and element signals 16 corresponding to elements 18 of an antenna 20 used for the transmission or reception of electromagnetic signals.

The beamformer 12 comprises beamforming circuitry 22 that is configured to apply beamforming weights 24 with respect to the element signals 16. The beamforming weights 24 define the respective beams 72 of the beam group 70 as spatially non-overlapping and having a fixed spatial relationships within the beam group 70. Beam-group steering circuitry 26 of the beamformer 12 is configured to apply beam-group steering weights 28 that commonly steer the respective beams 72 of the beam group 70 in a same direction.

The apparatus 10 further comprises control circuitry 30 that is configured to control the beam-group steering by the beam-group steering circuitry 26, based on controlling the beam-group steering weights 28. "Controlling" the beam-group steering weights 28 can be understood as setting or otherwise controlling the values of the beam-group steering weights 28, where particular sets of values yield corresponding particular pointing directions for the beam group 70.

The beamforming circuitry 22 comprises, for example, a fixed part 50 comprising delay elements 54 configured to apply the beamforming weights 24, and a variable part 52 comprising delay elements 56 configured to apply the beam-group steering weights 28. In at least one such embodiment of the beamforming circuitry 22, the delay elements 54 are true time delay lines 60 and the delay elements 56 are phase shifters 62. In such cases, the beam-group steering weights 28 comprise a phase shift vector, where the values of the vector elements define a relative phase shifting across the element signals 16 that results in a particular pointing direction for the beam group 70.

Example implementations of the true time delay lines 60 include digital or analog elements, with non-limiting examples including microstrip or stripline delay lines as typical implementations. Other examples include mechanically-tuned structures, RF-over-fiber arrangements (microwave photonics), coaxial or waveguide delay lines, various active circuits based on CMOS or GaAs technology, or micro-electro-mechanical structures (MEMs). Example implementations of phase shifters 62 also include MEMs devices or switchable transmission paths, albeit with the understanding that the maximum phase shift is less than one wavelength. In at least one embodiment, the phase shifters 62 comprise switched high-pass and low-pass LC filter structures to achieve the phase differences comprised in the beam-group steering circuitry 26.

Referring to FIGS. 4A-4D for example depictions, each beam 72 in the beam group 70 has an individual beam direction. Absolute beam directions of the respective beams 72 in free space are defined by the combination of the individual beam directions and the beam-group direction. Of course, it will be understood that the orientation of the apparatus 10 or, more specifically, the orientation of its antenna 20 will ultimately determine the absolute beam directions of the beams 72 in the beam group 70. However, for a given orientation of the antenna 20, the beams 72 have fixed spatial relationships with one another and relative beam angles defined by the beamforming weights 24, with the beam-group pointing direction defined by the beam-group steering weights 28 then controlling the absolute direction of each beam 72 in free space.

The control circuitry 30 in one or more embodiments is configured to control the beam-group steering by selecting phase adjustments as said beam-group steering weights 28 according to a schedule 36 that defines the phase adjustments to be applied in defined intervals, such that the schedule 36 determines the beam-group direction that is active in each defined interval. According to at least one such embodiment, with respect to a plurality of different beam-group directions that are activated according to the schedule 36, the respective beams 72 in the beam group 70 according to at least one of the different beam group directions partially overlap with the respective beams 72 in the beam group 70 according to at least one other one of the different beam group directions. In one or more other embodiments, the spatial positions occupied by the beams 72 for one beam-group pointing direction do not overlap with the spatial positions occupied by the beams 72 for any other beam-group pointing direction.

Consider an example case where there are N beams 72 in the beam group 70, with each beam 72 providing coverage in a corresponding beam coverage area 80. The apparatus 10 according to this embodiment is configured to apply a Time Division Multiple Access TDMA schedule that defines respective beam-group steering directions to use in respective scheduling intervals, to provide time-multiplexed coverage over up to M beam coverage areas 80, with N of M beam coverage areas 80 active in each scheduling interval, and where M equals the number of different beam-group steering directions used over the respective scheduling intervals.

The TDMA schedule may be a particular implementation of the schedule 36 shown in FIG. 1. In this context, a "beam coverage area" may be defined by an area of the electromagnetic radiation pattern of the associated beam, as projected on the ground or some other reference surface, having a signal power, signal-to-noise ratio (SNR), or signal-to-interference-plus-noise ratio (SINR) of signals communicated via the beam above a threshold acceptable for the communication service.

The beamforming circuitry 22 in at least one embodiment comprises N sets of delay elements 54, each such set providing a respective set of beamforming weights 24 defining a respective one of the N beams 72 in the beam group 70. Further, the beam-group steering circuitry 26 comprises one set of delay elements 56 configured to apply the beam-group steering weights 28 in common to the element signals 16. In an example case, there are Q sets of beam-group steering weights 28 defining Q different pointing directions, where a selected one of the Q beam-group steering weights 28 is applied in each scheduling interval. Each one of the Q sets of beam-group steering weights 28 comprises a phase vector having R vector elements, each vector element being a phase delay value corresponding to a respective one of the R antenna elements 18, and the overall phase vector defining a set of phase shifts that applied to the element signals 16 commonly steers the beams 72 of the beam group 70.

One advantage of such implementations of the apparatus 10 is that the apparatus 10 can provide coverage to M beam coverage areas 80, without requiring M different sets of delay elements 54 to form M beams. Because the delay elements 54 may be true time delay lines 60, their implementation is non-trivial, particularly with larger arrays of antenna elements 18. The disclosed approach incrementally shifts or steers a beam group 70 of N beams 72, so that N of M beam coverage areas 80 are "active" in each of a defined succession of intervals.

With the respective beams 72 of the beam group 70 having corresponding beam coverage areas 80 that commonly shift as the beam-group direction is changed, the control circuitry 30 in one or more embodiments is configured to activate a succession of beam-group directions over a succession of intervals, to provide time-multiplexed signal coverage over an aggregate coverage area that is an aggregation of the corresponding beam coverage areas 80 that are active in each interval. As noted, the apparatus 10 in one or more embodiments includes storage 34 that stores a schedule 36 that defines the succession of beam group directions.

Figure 5B:
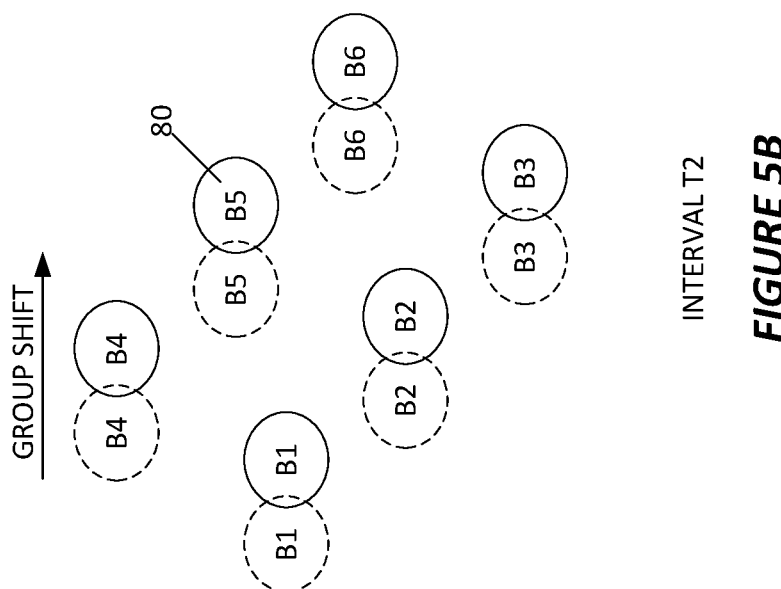
FIGS. 5A-5D are diagrams of example shifting of beam coverage areas corresponding to respective beams of a beam group, based on beam-group steering.
Figure 5A:
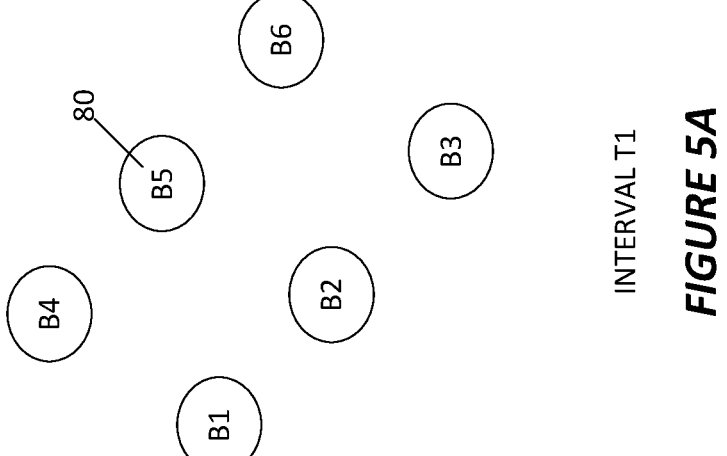

Consider FIGS. 5A-5E, which illustrate example time-multiplexing of beam coverage areas 80 by the apparatus 10. In the example context of FIGS. 5A-5E, there are six beams 72 in the beam group 70 (N=6), with the six beams 72 labeled B1, B2, B3, B4, B5, and B6. Correspondingly, FIG. 5A depicts six beam coverage areas 80, with each beam coverage area 80 labeled according to the beam 72 that corresponds to it.

In a first time interval T1, the control circuitry 30 of the apparatus 10 controls the beamformer 12 to apply beam-group steering weights 28 that yield the depicted locations of the beam coverage areas 80. These locations are, for example, geographic regions on the surface of the earth, and they can be understood as signal coverage areas in the sense that the apparatus 10 can transmit signals for reception by other apparatuses operating in the beam coverage areas 80 or receive signals from other apparatuses operating in the beam coverage areas 80.

Figures 5C, 5D, 5E:
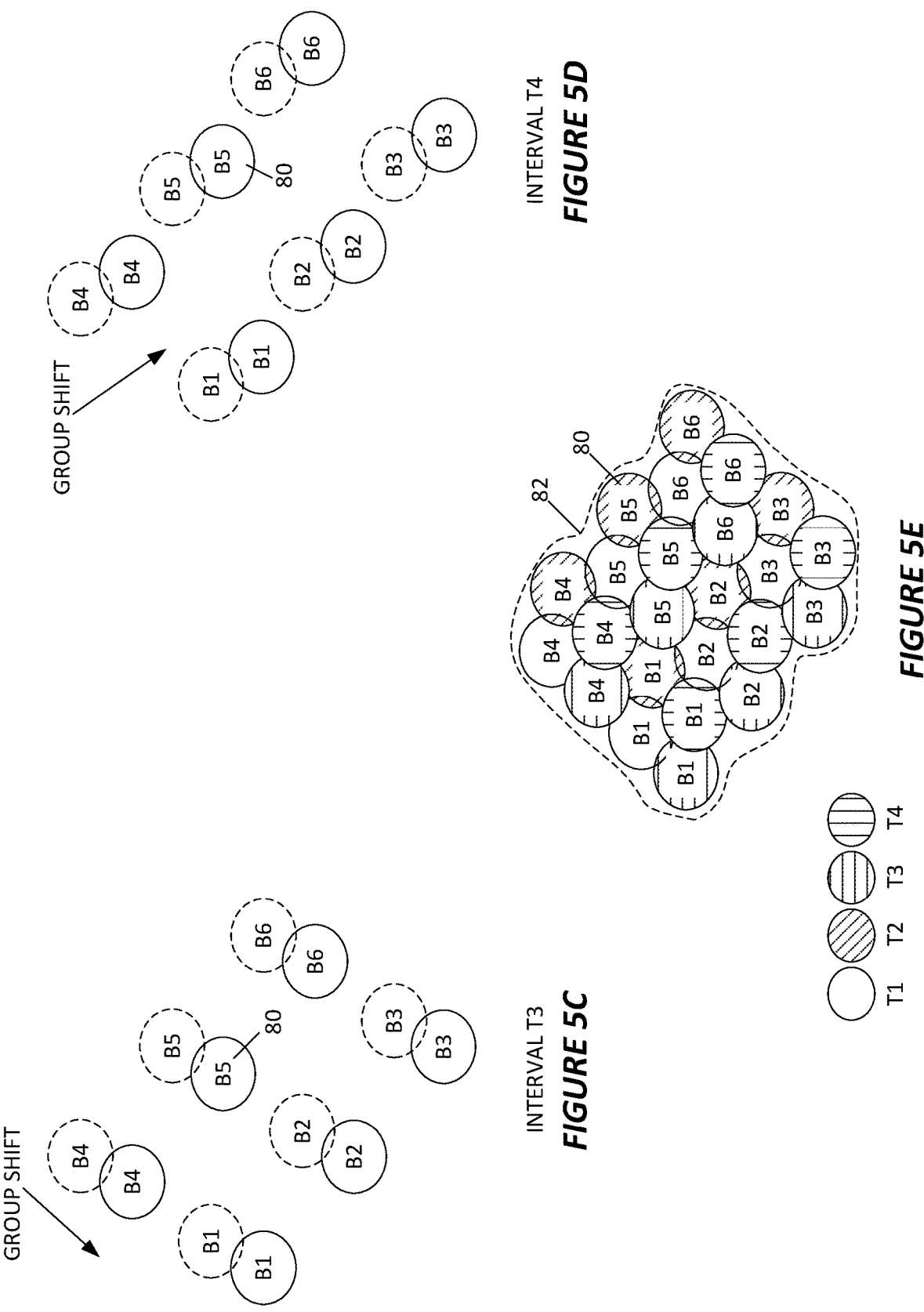
FIG. 5E is a diagram illustrating time-multiplexed signal coverage over an aggregate coverage area, using a beam group that is steered over or through the aggregate coverage area according to a Time Division Multiple Access (TDMA) schedule.

For time interval T2, the control circuitry 30 changes the values of the beam-group steering weights 28, which causes a groupwise shifting of the beams 72 in the beam group 70. FIG. 5B suggests the group shift by showing the positions/locations of the beam coverage areas 80 for interval T1 in dashed lines and showing the new positions/locations of the beam coverage areas for interval T2 in solid lines. FIG. 5C illustrates the beam-group shift applied for interval T3, with the prior (T2) positions/locations of the beam coverage areas 80 shown in dashed lines and the new (T3) positions/ locations of the beam coverage areas 80 shown in solid lines. FIG. 5D shows the beam-group shift between interval T3 and interval T4.

FIG. 5E illustrates how the foregoing shifting—beam-group steering—of the beam group 70 may be used to provide time-multiplexed coverage over an aggregate coverage area 82. Thus, the aggregate coverage area 82 may be understood as comprising M beam coverage areas 80, but where only N non-overlapping ones of the M_beam coverage areas 80 are active at a time. Each set of N non-overlapping beam coverage areas 80 represents a different beam-group pointing direction, such that providing signal coverage to all M beam coverage areas 80 requires stepping through the different beam-group point directions according to a fixed or dynamically-determined schedule.

FIGS. 5A-5E, therefore, can be understood as showing that the N beam coverage areas 80 that are "active" or "illuminated" in any given interval by the beams 72 in the beam group 70 for a current pointing direction are non-overlapping. However, the beam-group steering may be performed such that the N beam coverage areas 80 that are active in a next or succeeding interval may overlap with those of a prior interval. In this manner, time multiplexed signal-coverage may be provided everywhere within the aggregate coverage area 82, over the successive intervals.

The angular shift commonly imparted to all beams 72 in the beam group 70 that arises from changing the values of the beam-group steering weights 28 applied by the beam-group steering circuitry 26 moves all the beams 72 of the beam group 70 in the same direction and, at least nominally, each beam 72 experiences the same beam angle change, meaning that, in the nominal case, the corresponding beam coverage areas 80 commonly shift in the same direction by the same amount. Deviations from the nominal case arise, for example, from component tolerances or other non-ideal behaviors within the structure(s) used to implement the beamformer 12 and the apparatus 10, at large.

A further point is that the beam coverage areas 80 shown in FIGS. 5A-5E represent beam coverage according to some defined signal level threshold, e.g., 3-dB beamwidths. Therefore, it should be understood that one or more embodiments of the apparatus 10 involve beams 72 that are non-overlapping according to a defined signal-level threshold but may exhibit overlap at signal levels below the threshold.

Figure 6:
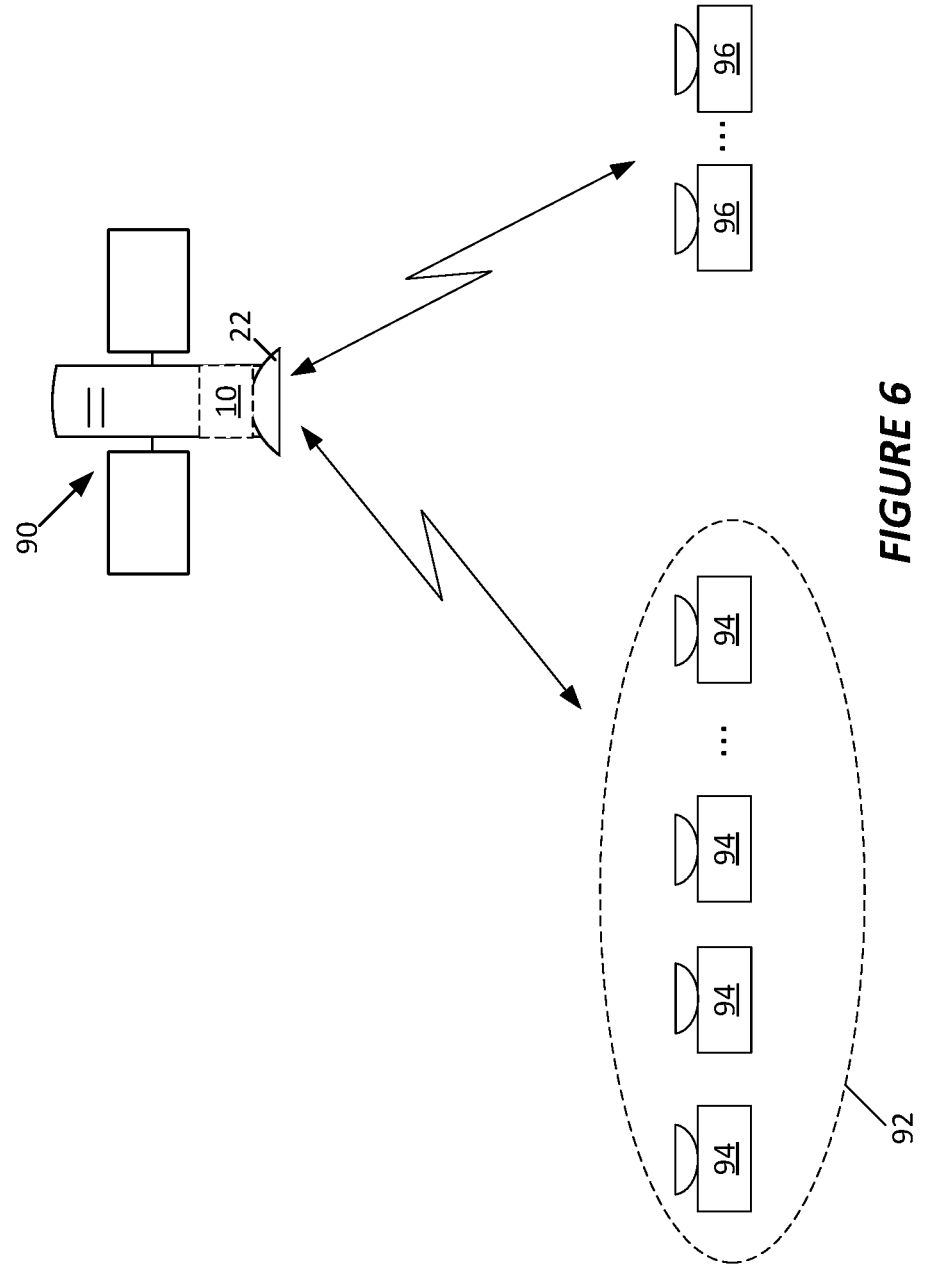
FIG. 6 is a block diagram of a communication satellite that includes an embodiment of the apparatus 10 introduced in FIG. 1.

The apparatus 10 and associated methods are useful across a broad range of applications and scenarios but may have particular advantages in the context of satellite communications. FIG. 6 illustrates an embodiment of the apparatus 10 where it is the communications payload of a communications satellite 90. In some embodiments, the communications satellite 90 is a Low Earth Orbit (LEO) satellite.

The apparatus 10 and antenna 20 are onboard the communications satellite 90, which acts as a relay for communications going between respective terrestrial terminals, such as between terrestrial user terminals 94 and terrestrial gateway stations 96. Forward-channel traffic goes from respective ones of one or more terrestrial gateway stations 96 to respective ones among the terrestrial user terminals 94. The terrestrial user terminals 94 may be distributed across a relatively large geographic area 92, which may be regarded as an aggregate coverage area that is provided with signal coverage by the communications satellite 90 according to a TDMA schedule 36 that defines which beam-group pointing direction to use in each interval among a defined or running succession of intervals. The terrestrial gateway stations 96 may occupy respective locations within the geographic area 92.

In one or more example embodiments, transmit or receive signals beamformed by the communications satellite 90 have a timing structure defined by recurring frames of a uniform temporal length, with each frame divided into a uniform number of subframes, which may be further divided into timeslots. Individual timeslots represent the smallest scheduling interval, for example, meaning that the communications satellite 90 may change beam-pointing directions on a per-timeslot basis. Of course, the particular pointing directions used and the number of times a particular pointing direction is used over a scheduling cycle, e.g., one frame or one subframe, may be controlled dynamically, to reflect the distribution of terrestrial user terminals 94 or communication demands within the geographic area 92. Other scheduling-interval definitions may be used, and the frame/subframe/timeslot structuring is a non-limiting example.

Broadly, the apparatus 10 in one or more embodiments provides a communication service to other apparatuses operating within an aggregate coverage area, based on a schedule 36 that defines the beam-group pointing directions used to shift or step a beam group 70 to provide time-multiplexed coverage over the aggregate coverage area. FIG. 5E illustrates an example aggregate coverage area 82 and FIG. 6 illustrates another example aggregate coverage area 92. Notably, however, the "aggregate coverage area" at issue may or may not represent coverage on the surface of the earth, in dependence on the intended use and implementation of the apparatus 10. However, "coverage area" may be understood as "spot beam" ground coverage within the context of FIG. 6 and satellite communications more broadly. Spot-beam coverage may also be referred to as "beam footprints" and applying that context to the broader example of FIG. 5E means that, in the satellite-coverage context, the beam coverage areas 80 depicted in FIG. 5E may be regarded as spot beam footprints on the surface of the Earth.

Whether implemented in a communications satellite 90 or implemented in another communications context, the apparatus 10 may determine a schedule 36 dynamically, or a supporting apparatus—such as the apparatus 46 depicted in the generic example of FIG. 1 or a terrestrial gateway station 96 in the satellite-specific example of FIG. 6—dynamically determines the schedule 36 and transmits it to the apparatus 10. As a particular example in the communications context, the schedule 36 is determined dynamically, based on communication needs and locations of the other apparatuses within the aggregate coverage area. In the context of satellite communications, a terrestrial gateway station 96 or other entity within the supporting ground network may compute the schedule 36 on a recurring or triggered basis, with schedule updates uploaded to the communications satellite 90 in-flight via one of the terrestrial gateway stations 96.

With specific reference to FIG. 6, a coverage area 92 is a geographic region in which terrestrial user terminals 94 or terrestrial gateway stations 96 operate, and the beam-group pointing directions are used to provide satellite signal coverage over a multiplicity of spot-beam coverage areas according to the schedule 36. A terrestrial gateway station 96 may provide the schedule 36 to the communications satellite 90, and the schedule 36 may be dynamically determined or otherwise dynamically updated based on the number, distribution, and communication needs of the terrestrial user terminals 94 operating within the geographic area 92. For example, some beam-pointing directions may be used more often or for longer durations than other beam-pointing directions, to serve denser populations of terrestrial user terminals 94 within geographic area 92, or to accommodate Quality-of-Service (QoS) requirements of particular users or particular communication services.

In an example configuration, the beam group 70 comprises N non-overlapping beams 72 and, with respect to M beam coverage areas 80, where M>N, the control circuitry 30 is configured to control the beam-group steering to activate different subsets of N non-overlapping beam coverage areas 80 among the M beam coverage areas 80 in different intervals. Here, a "beam" may be defined by its power profile, e.g., its 3-dB beamwidth, or may be defined by some other signal-level parameter. Using the 3-dB value for example, "non-overlapping beams" means that there is no overlap of respective beam areas defined by their 3-dB beamwidths. In other embodiments, overlap is considered more conservatively. For example, in some embodiments, two beam coverage areas are considered as non-overlapping only when their respective 4-dB beamwidths are non-overlapping, so that their 3-dB beamwidths are spaced further apart. In some embodiments, two beams are considered non-overlapping when the two beams do not produce unacceptable interference with one another.

The control circuitry 30 may be configured to control which subsets of N non-overlapping beam coverage areas among the M beam coverages areas 80 are active in which intervals, according to a schedule 36 that defines a TDMA pattern of beam-group pointing directions according to which the beam group 70 is steered. When the apparatus 10 is a payload of a satellite, e.g., the communications satellite 90 in the example of FIG. 6, use of the TDMA pattern configures the apparatus 10 to provide time-multiplexed signal coverage over a larger geographic area 92 than is covered by the beam group 70 at any given time.

More generally, in one or more embodiments, the control circuitry 30 of the apparatus 10 is configured to change the beam-group direction over a succession of intervals, such that the beam-group direction incrementally steps through a defined angular range, and corresponding beam coverage areas 80 of the beam group 70 incrementally shift within a larger coverage area. The stepping need not be uniform in terms of (angular) direction or step size.

FIG. 7 illustrates another example embodiment comprising a method 700 of operation by an apparatus 10 that uses beamforming for transmission or reception of electromagnetic signals. The method 700 comprises pointing (Block 702) a beam group 70 in a first beam-group direction during a first interval by applying, in a beamformer 12 of the apparatus 10, first beam-group steering weights 28 that commonly steer respective beams 72 of the beam group 70 in a same first direction. Here the beamformer 12 of the apparatus 10 converts between beam signals 14 corresponding to the respective beams 72 in the beam group 70 and element signals 16 corresponding to elements 18 of an antenna 20 used for the transmission or reception of electromagnetic signals. Further, the beamformer 12 applies beamforming weights 24 that define the respective beams 72 of the beam group 70 as spatially non-overlapping and having fixed spatial relationships within the beam group 70.

The method 700 further comprises pointing (Block 704) the beam group 70 in a second beam-group direction during a second interval by applying, in the beamformer 12, second beam-group steering weights 28 that commonly steer the respective beams 72 of the beam group 70 in a same second direction. Steering the beam group 70 by application of the first or second beam-group steering weights 28 preserves the fixed spatial relationship within the beam group 70 by commonly moving all respective beams 72 in the same first or second direction.

The first and second intervals are among a plurality of intervals, for example, such as may be defined by a schedule 36 that specifies which beam-group direction is used in each interval. In such embodiments, the method 700 comprises controlling the beam-group steering according to the schedule 36, e.g., by changing the values of the beam-group steering weights 28 used in the beamformer 12, for different ones among the scheduling intervals.

In an example configuration, there are N beams 72 in the beam group 70, with each beam 72 providing coverage in a corresponding beam coverage area 80, and the method 700 comprises applying a TDMA schedule that defines respective beam-group steering directions to use in respective scheduling intervals, to provide time-multiplexed coverage over up to M beam coverage areas 80, with M>N and with N of M beam coverage areas 80 active in each scheduling interval.

The respective beams 72 of the beam group 70 have corresponding beam coverage areas 80 that commonly shift as the beam-group direction is changed, and the method 700 in one or more embodiments comprises activating a succession of beam-group directions over a succession of intervals, to provide time-multiplexed signal coverage over an aggregate coverage area 82, 92 that is an aggregation of the corresponding beam coverage areas 80 that are active in each interval. The method 700 may further include determining the succession of beam group directions according to a schedule 36 stored in the apparatus 10. In at least one embodiment, the apparatus 10 provides a communication service to other apparatuses operating within an aggregate coverage area, and the schedule 36 is dynamically determined, based on communication needs and locations of the other apparatuses within the aggregate coverage area.

The beam group 70 comprises N non-overlapping beams 72 in an example configuration. With respect to M beam coverage areas 80, where M>N, the method 700 comprises controlling the beam-group steering to activate different subsets of N non-overlapping beam coverage areas among the M beam coverage areas 80 in different intervals. Controlling which subsets of the N non-overlapping beam coverage areas among the M beam coverage areas 80 are active in which intervals may be done according to a schedule 36 that defines a TDMA pattern of active beam coverage areas 80.

In a scenario where the apparatus 10 is a payload of a communications satellite 90, the method 700 comprises using the beam-group steering to provide time-multiplexed signal coverage over a larger area than is covered by the beam group 70 at any given time—i.e., pointing the beam group 70 in different directions at different times provides broader, albeit time-multiplexed coverage. For example, the method 700 includes changing the beam-group direction over a succession of intervals, such that the beam-group direction incrementally steps through a defined angular range, and corresponding beam coverage areas 80 of the beam group 70 incrementally shift within the larger coverage area.

A method of operation according to another embodiment comprises the apparatus 10 applying beamforming weights 24 in a beamformer 12 to define a beam group 70 comprising respective beams 72 having fixed spatial relationships. Here, the beamforming weights 24 may be respective sets of beamforming weights comprising complex coefficients representing relative amplitudes and delays that define the respective beams 72 in the beam group 70. The method further comprises the apparatus 10 effectively modifying the respective sets of beamforming weights 24 by applying a common set of beam-group steering weights, the beam-group steering weights 28, to point the beam group 70 in a beam-group direction defined by the values of the beam-group steering weights 28. A particular implementation of the method comprises applying the beamforming weights 24 using respective sets of delay elements 54 implemented as true time delay lines 60 and applying the beam-group steering weights 28 as a set of phase shifts applied via a set of phase shifters 62 that apply relative phase shifts to the element signals 16 split into or combined from the respective sets of delay elements 54.

Figure 8:
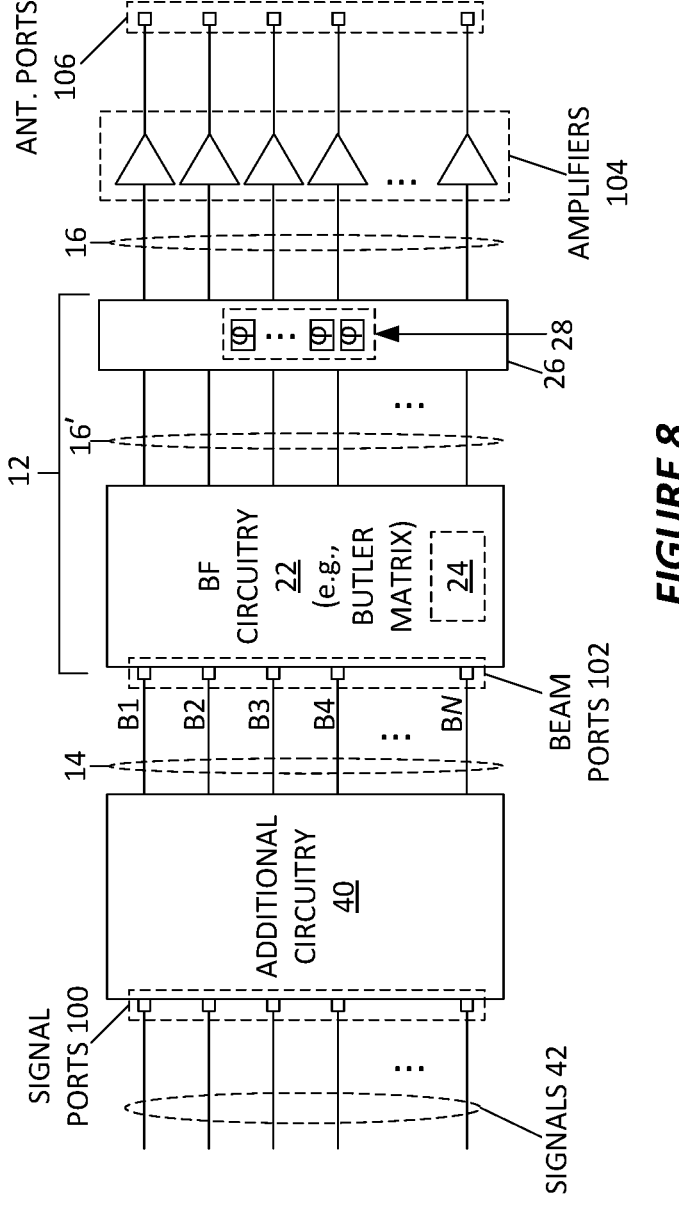
FIGS. 8-11 are block diagrams of example embodiments of beamformers and related beamforming circuitry.

FIG. 8 illustrates an example embodiment of the beamformer 12, shown in situ with supporting circuitry. Here, the beamformer 12 is configured for transmit beamforming and respective signals 42 for transmission are input to signal ports 100 of the additional circuitry 40, which may include a radiofrequency (RF) switch matrix. Alternatively, the additional circuitry 40 is configured to generate the respective signals 42 for transmission. As such, the additional circuitry 40 provides or otherwise maps any one or more of the signals 42 to any one or more of the beam ports 102 of the beamformer 12. That is, for transmission of any given one of the transmit signals 42 in any particular one of the beams 72 of the beam group 70, the additional circuitry 40 applies that transmit signal 42 to the beam port 102 associated with the particular beam 72. As multiple transmit signals 42 may be applied to the same beam port 102, the signals going into the beam ports 102 are referred to as beam signals 14, where each beam signal 14 comprises one transmit signal 42 or a composite of two or more transmit signals 42, depending on the switching/mapping configuration of the additional circuitry 40.

The beam ports 102 couple the beam signals 14 into the beamforming circuitry 22, which is implemented as a Butler matrix in one or more embodiments. The beamforming circuitry 22 applies the beamforming weights 24—amplitudes and delays—that define the beam group 70 with its spatially non-overlapping beams 72. The beamforming weights 24 may be preconfigured or otherwise fixed within the beamforming circuitry 22 or may be controlled by the control circuitry 30.

In at least one embodiment, the beamforming circuitry 22 is fixed in terms of the beam configuration it produces, although it may have calibration or fine-tuning adjustability. With such approaches, the beamforming circuitry 22 outputs element signals 16' corresponding to the individual elements 18 of the antenna 20 being used for beamforming, where these element signals 16' have the relative inter-signal delays and amplitudes that provide the constructive and destructive wavefront combining of the corresponding antenna-radiated signals that form the beams 72 of the beam group 70 in the far field.

The beam-group steering circuitry 26 may comprise a set of phase shifters, such as the phase shifters 62 shown in FIG. 3B, with one phase shifter 62 per antenna element 18, or, phrased differently, with one phase shifter 62 for each element signal 16' output from the beamforming circuitry 22. The set of phase shifts apply the beam-group steering weights 28 as a phase vector that defines the relative phasing (phase differences) across the element signals 16' to steer the beam group 70 in a particular direction. The control circuitry 30 in the apparatus 10 provides the phase vector to the beam-group steering circuitry 26 in one or more embodiments, while in other embodiments, the control circuitry 30 provides one or more switching or other control signals to the beam-group steering circuitry 26, to control which phase vector the beam-group steering circuitry 26 applies. For example, the beam-group steering circuitry 26 may comprise switchable filters, with different switched configurations providing different phasing.

Among several advantages flowing from the depicted arrangement, the beam-group steering circuitry 26 needs only one set of phase shifters 62 because, in the transmit context, it operates on the element signals 16' after the application of the sets of beamforming weights used to form the multiplicity of beams 72 in the beam group 70.

Applying the beam-group steering weights 28 to the element signals 16' via the beam-group steering circuitry 26 yields the element signals 16, which are then amplified via a set of power amplifiers (PAs) 104 and passed to the respective antenna ports 106. The antenna ports 106 correspond to the individual antenna elements 18 used for transmit beamforming. By changing the values of the beam-group steering weights 28 applied by the beam-group steering circuitry 26, the control circuitry 30 controls the transmit pointing direction of the beam group 70.

Figures 9, 10:
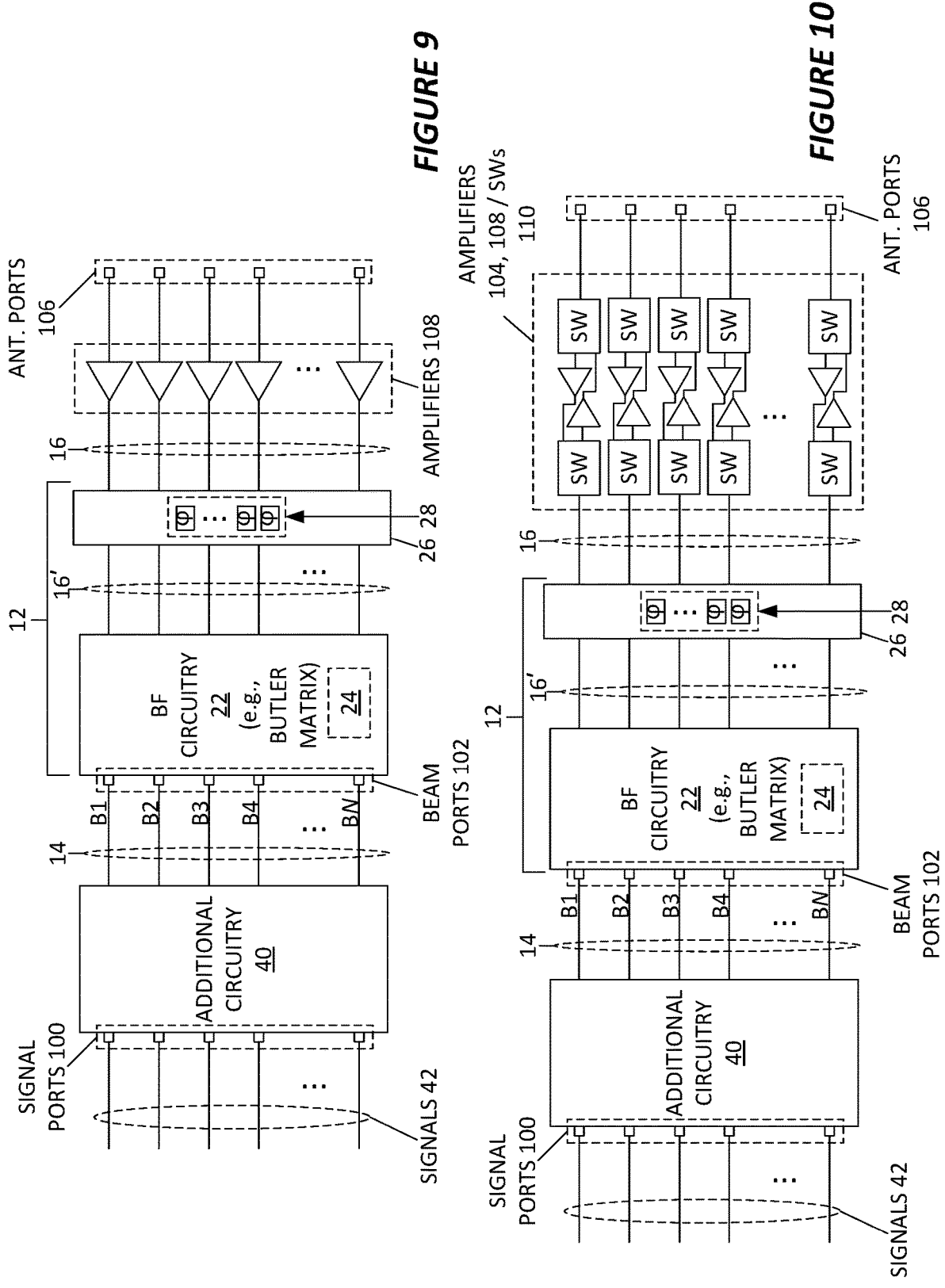

FIG. 9 contrasts with FIG. 8 by showing a receive beamforming configuration rather than a transmit beamforming configuration. Antenna-element received signals pass from the antenna ports 106 into respective low noise amplifiers (LNAs) 108, which output the element signals 16 operated on by the beam-group steering circuitry 26. The beam-group steering weights 28 applied by the beam-group steering circuitry 26 define the receive pointing direction of the beam group 70, with the resulting set of element signals 16' having the respective inter-signal phase shifts corresponding to the defined receive pointing direction. The beamforming circuitry 22 in the receive direction operates on the element signals 16' and outputs corresponding beam signals 14, each beam signal 14 reflecting signal reception in the (angular) direction defined by beam angle of the respective beam 72 in the beam group 70, as adjusted by the beam-group steering.

FIG. 10 illustrates another embodiment in which the beamformer 12 and its included beamforming circuitry 22 provide both transmit beamforming and receive beamforming, e.g., transmit beamforming in one interval and receive beamforming in another interval. Supporting circuitry providing the transmit/receive beamforming capabilities includes a set of the aforementioned PAs 104 that are in the transmit signal path, and a set of the aforementioned LNAs 108 that are in the receive signal path, along with respective sets of switches 110 that control whether the transmit signal path or the receive signal path is active.

Figure 11:
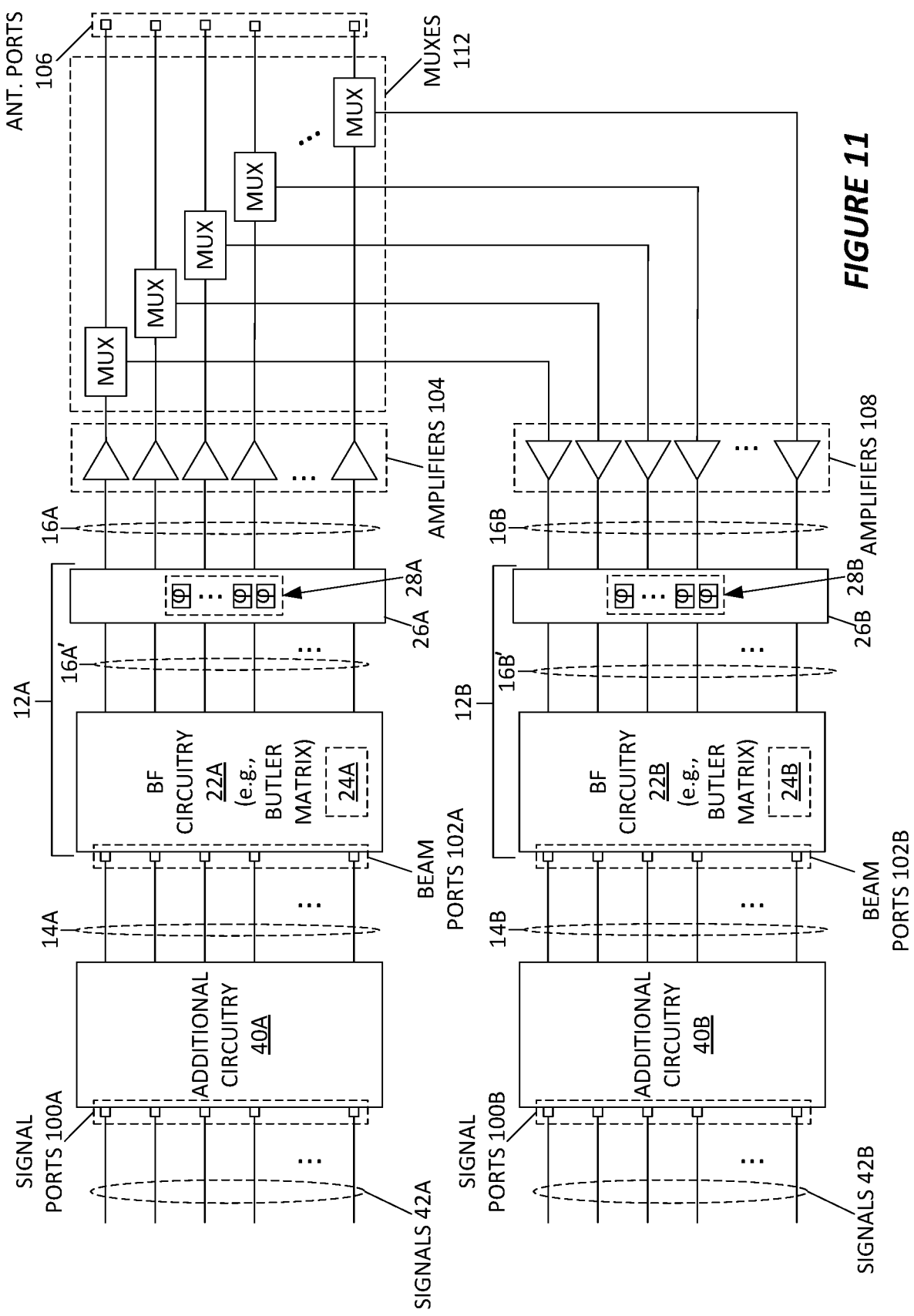

FIG. 11 illustrates another embodiment that provides transmit beamforming and receive beamforming, with a key distinction from the embodiment shown in FIG. 10 being the capability of full-duplex operation—i.e., simultaneous transmit beamforming and receive beamforming. Rather than selectively switching in the transmit signal path or the receive signal path, the arrangement depicted in FIG. 11 uses a set of multiplexers ("MUXES") 112 to provide simultaneous transmit and receive signal paths, with respective sets of transmit circuitry and receive circuitry.

Transmit signals 42A are processed or otherwise passed through the various elements in the transmit signal path, which include additional circuitry 40A, beamforming circuitry 22A, beam-group steering circuitry 26A, PAs 104, and the set of multiplexers 112. The set of multiplexers 112 also provide antenna-received signals to LNAs 108, which provide amplified versions of those signals to beam-group steering circuitry 26B, which feeds into beamforming circuitry 22B, which in turn feeds into additional circuitry 40B that outputs or otherwise processes receive signals 42B. The beamforming weights 24A and the beam-group steering weights 28A used for transmit beamforming need not be the same as the beamforming weights 24B and the beam-group steering weights 28B used for receive beamforming.

Any of the arrangements depicted in FIGS. 8-11 may be implemented in the apparatus 10 introduced in FIG. 1, but the apparatus 10 is not limited to these example arrangements. For example, although FIGS. 8-11 depict separation of the beamforming circuitry 22 and the beam-group steering circuitry 26, the beamforming circuitry 22 and the beam-group steering circuitry 26 may be integrated. For example, the beamforming circuitry 22 may include a mixture of fixed or preconfigured elements and variable or adjustable elements, with the variable or adjustable elements used for applying the beam-group steering weights 28. Such elements in one or more embodiments also provide for calibration or adjustment of the beam group 70. "Elements" in this regard comprise true time delay lines or phase shifters or any mixture thereof.

One attribute of the apparatus 10, regardless of its implementation details, is the use of a simplified approach to steering an entire group 70 of beams 72, such that the beam group 70 can be pointed in different directions at different times and allow, in time-multiplexed fashion, one beam group 70 to provide coverage over a larger area than covered by the beam group 70 at any one time. The simplified approach comprises applying beam-group steering weights 28 to the element signals 16 incoming from or outgoing to the respective antenna elements 18 of the antenna 20 being used for beamforming. The beam-group steering weights 28 comprise, for example, a phase vector whose vector elements are respective phase values, with the respective phase values defining inter-signal delays that yield the desired beam-group pointing direction.

In at least one embodiment, the apparatus 10 comprises the payload of a communications satellite, such as the communications satellite 90 depicted in FIG. 6. Use of the simplified beam-group steering in the satellite context accentuate or amplifies the various advantages of the apparatus 10. An example of the amplified benefits is that weight, size, and power are critical factors in satellite design and the apparatus 10 allows a relatively small, sparse set of beams to be used to provide coverage over a much larger area, albeit in time-multiplexed fashion. Consequently, the satellite need carry only a reduced set of beamforming circuitry as compared to what would be required to independently form all the beams needed to cover the larger area, with concomitant weight and power-consumption savings.

A further advantage or point of operational flexibility that applies to the satellite context and to a broad range of other contexts is demand-driven scheduling for controlling the beam-group steering. With demand-driven scheduling or, more broadly, dynamic scheduling, the pointing directions of the beam group are controlled according to need, meaning that how often or how long the beam group is pointed in a particular direction depends on the coverage needs associated with that direction. Here, "coverage needs" means communications demand in a communications context, but means something different in other contexts, such as radar sensing, where "coverage needs" refers to the criticality or priority associated with radar-based sensing in a particular direction.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An apparatus that uses beamforming for transmission or reception of electromagnetic signals, the apparatus comprising:

a beamformer configured to convert between beam signals corresponding to respective beams in a beam group and element signals corresponding to elements of an antenna used for the transmission or reception of electromagnetic signals, wherein the beamformer comprises beamforming circuitry configured to apply beamforming weights that define the respective beams of the beam group as spatially non-overlapping and having fixed spatial relationships within the beam group, and the beamformer further comprises beam-group steering circuitry configured to apply beam-group steering weights that commonly steer the respective beams of the beam group in a same direction; and control circuitry configured to control the beam-group steering by the beam-group steering circuitry, based on controlling the beam-group steering weights.

2. The apparatus of claim 1, wherein the beamforming circuitry comprises a fixed part of the beamformer comprising delay elements configured to apply the beamforming weights, and the beam-group steering circuitry comprises a variable part of the beamformer comprising delay elements configured to apply the beam-group steering weights.

3. The apparatus of claim 2, wherein the delay elements are true time delay lines and wherein the delay elements are phase shifters.

4. The apparatus of claim 1, wherein each beam in the beam group has an individual beam direction and wherein absolute beam directions of the respective beams in free space are defined by the combination of the individual beam directions and the beam-group direction.

5. The apparatus of claim 1, wherein the control circuitry is configured to control the beam-group steering by selecting phase shifts as said beam-group steering weights according to a schedule that defines the phase shifts to be applied in defined intervals, such that the schedule determines the beam-group direction that is active in each defined interval.

6. The apparatus of claim 5, wherein, with respect to a plurality of different beam-group directions that are activated according to the schedule, the respective beams in the beam group according to at least one of the different beam group directions partially overlap with the respective beams in the beam group according to at least one other one of the different beam group directions.

7. The apparatus of claim 1, wherein there are N beams in the beam group, with each beam providing coverage in a corresponding beam coverage area, and wherein the apparatus is configured to apply a Time Division Multiple Access (TDMA) schedule that defines respective beam-group steering directions to use in respective scheduling intervals, to provide time-multiplexed coverage over up to M beam coverage areas, with N beam coverage areas active in each scheduling interval, and where M equals the number of different beam-group steering directions used over the respective scheduling intervals.

8. The apparatus of claim 7, wherein the beamforming circuitry comprises N sets of delay elements, each providing a respective set of beamforming weights defining a respective one of the N beams in the beam group, and wherein the beam-group steering circuitry comprises one set of delay elements configured to apply the beam-group steering weights in common to the element signals, there being Q sets of beam-group steering weights defining Q pointing directions for the beam group.

9. The apparatus of claim 1, wherein the respective beams of the beam group have corresponding beam coverage areas that commonly shift as the beam-group direction is changed, and wherein the control circuitry is configured to activate a succession of beam-group directions over a succession of intervals, to provide time-multiplexed signal coverage over an aggregate coverage area that is an aggregation of the corresponding beam coverage areas that are active in each interval.

10. The apparatus of claim 9, wherein the apparatus further comprises storage configured to store a schedule that defines the succession of beam group directions.

11. The apparatus of claim 10, wherein the apparatus provides a communication service to other apparatuses operating within the aggregate coverage area, and wherein the schedule is dynamically determined by the apparatus or by a supporting apparatus, based on communication needs and locations of the other apparatuses within the aggregate coverage area.

12. The apparatus of claim 1, wherein the beam group comprises N beams and, with respect to M beam coverage areas, where M>N, the control circuitry is configured to control the beam-group steering circuitry to activate different subsets of N non-overlapping beam coverage areas among the M beam coverage areas in different intervals.

13. The apparatus of claim 12, wherein the control circuitry is configured to control which subsets of the N non-overlapping beam coverage areas among the M beam coverages areas are active in which intervals, according to a Time Division Multiple Access (TDMA) schedule.

14. The apparatus of claim 1, wherein the apparatus is a payload of a communications satellite that is configured to use the beam-group steering to provide time-multiplexed signal coverage over a larger area than is covered by the beam group at any given time.

15. The apparatus of claim 14, wherein the control circuitry is configured to change the beam-group direction over a succession of intervals, such that the beam-group direction incrementally steps through a defined angular range, and corresponding beam coverage areas of the beam group incrementally shift within the larger coverage area.

16. A method of operation by an apparatus that uses beamforming for transmission or reception of electromagnetic signals, the method comprising:

pointing a beam group in a first beam-group direction during a first interval by applying, in a beamformer of the apparatus, first beam-group steering weights that commonly steer respective beams of the beam group in a same first direction, wherein the beamformer of the apparatus converts between beam signals corresponding to the respective beams in the beam group and element signals corresponding to elements of an antenna used for the transmission or reception of electromagnetic signals, the beamformer applying beamforming weights that define the respective beams of the beam group as spatially non-overlapping and having fixed spatial relationships within the beam group; and pointing the beam group in a second beam-group direction during a second interval by applying, in the beamformer, second beam-group steering weights that commonly steer the respective beams of the beam group in a same second direction.

17. The method of claim 16, wherein each beam in the beam group has an individual beam direction and wherein absolute beam directions of the respective beams in free space are defined by the combination of the individual beam directions and the beam-group direction.

18. The method of claim 16, wherein steering the beam group by application of the first or second beam-group steering weights preserves the fixed spatial relationship within the beam group by commonly moving all respective beams in the same first or second direction.

19. The method of claim 16, wherein the first and second intervals are among a plurality of intervals defined by a schedule that specifies which beam-group direction is used in each interval, and wherein the method comprises controlling the beamformer according to the schedule.

20. The method of claim 19, wherein, with respect to a plurality of different beam-group directions that are used according to the schedule, the respective beams in the beam group according to at least one of the different beam group directions partially overlap with the respective beams in the beam group according to at least one other one of the different beam group directions.

21. The method of claim 16, wherein there are N beams in the beam group, with each beam providing coverage in a corresponding beam coverage area, and wherein the method comprises applying a Time Division Multiple Access (TDMA) schedule that defines respective beam-group steering directions to use in respective scheduling intervals, to provide time-multiplexed coverage over up to M beam coverage areas, with N beam coverage areas active in each scheduling interval, and where M equals the number of different beam-group steering directions used over the respective scheduling intervals.

22. The method of claim 21, wherein there are Q sets of beam-group steering weights, each one of the Q sets of beam-group steering weights defining a different pointing direction for the beam group, and wherein the method comprises selecting one of the Q sets of beam-group steering weights for application by the beamformer in each scheduling interval.

23. The method of claim 16, wherein the respective beams of the beam group have corresponding beam coverage areas that commonly shift as the beam-group direction is changed, and wherein the method comprises activating a succession of beam-group directions over a succession of intervals, to provide time-multiplexed signal coverage over an aggregate coverage area that is an aggregation of the corresponding beam coverage areas that are active in each interval.

24. The method of claim 23, wherein the method further comprises determining the succession of beam group directions according to a schedule stored in the apparatus.

25. The method of claim 24, wherein the apparatus provides a communication service to other apparatuses operating within the aggregate coverage area, and wherein the schedule is dynamically determined, based on communication needs and locations of the other apparatuses within the aggregate coverage area.

26. The method of claim 16, wherein the beam group comprises N beams and, with respect to M beam coverage areas, where M>N, and wherein the method comprises controlling the beam-group steering to activate different subsets of N non-overlapping beam coverage areas among the M beam coverage areas in different intervals.

27. The method of claim 26, wherein the method comprises controlling which subsets of the N non-overlapping beam coverage areas among the M beam coverages areas are active in which intervals, according to a Time Division Multiple Access (TDMA) schedule.

28. The method of claim 16, wherein the apparatus is a payload of a communications satellite, and wherein the method comprises using the beam-group steering to provide time-multiplexed signal coverage over a larger area than is covered by the beam group at any given time.

29. The method of claim 28, wherein the method includes changing the beam-group direction over a succession of intervals, such that the beam-group direction incrementally steps through a defined angular range, and corresponding beam coverage areas of the beam group incrementally shift within the larger coverage area.

\* \* \* \* \*